(12) United States Patent
Wiese

(10) Patent No.: US 11,547,970 B2
(45) Date of Patent: Jan. 10, 2023

(54) MEMBRANE BUNDLE LAYOUT HAVING SPACERS

(71) Applicant: Evonik Fibres GmbH, Schörfling am Attersee (AT)

(72) Inventor: Frank Wiese, Wuppertal (DE)

(73) Assignee: Evonik Fibres GmbH, Schörfling (AT)

( * ) Notice: Subject to any disclaimer, the term of this patent is extended or adjusted under 35 U.S.C. 154(b) by 198 days.

(21) Appl. No.: 16/763,030

(22) PCT Filed: Nov. 8, 2018

(86) PCT No.: PCT/EP2018/080615
§ 371 (c)(1),
(2) Date: May 11, 2020

(87) PCT Pub. No.: WO2019/092105
PCT Pub. Date: May 16, 2019

(65) Prior Publication Data
US 2020/0384417 A1   Dec. 10, 2020

(30) Foreign Application Priority Data

Nov. 9, 2017   (EP) .................................... 17200834
Dec. 20, 2017  (EP) .................................... 17208806

(51) Int. Cl.
*B01D 63/02*       (2006.01)

(52) U.S. Cl.
CPC ........... *B01D 63/02* (2013.01); *B01D 63/024* (2013.01); *B01D 2313/14* (2013.01); *B01D 2315/10* (2013.01)

(58) Field of Classification Search
CPC ............ B01D 2313/10; B01D 2313/14; B01D 2315/10; B01D 2323/14; B01D 63/02;
(Continued)

(56) References Cited

U.S. PATENT DOCUMENTS

| | | |
|---|---|---|
| 4,066,553 A | 1/1978 | Bardonnet et al. |
| 4,293,418 A | 10/1981 | Fujii et al. |
| (Continued) | | |

FOREIGN PATENT DOCUMENTS

| | | |
|---|---|---|
| CN | 205867846 U | 1/2017 |
| DE | 2825065 A1 | 12/1979 |
| (Continued) | | |

OTHER PUBLICATIONS

U.S. Appl. No. 14/898,093, filed Dec. 11, 2015, 2016/0151744, Jun. 2, 2016, U.S. Pat. No. 10,456,750, Oct. 29, 2019.
(Continued)

*Primary Examiner* — Pranav N Patel
(74) *Attorney, Agent, or Firm* — Michael Best & Friedrich LLP

(57) ABSTRACT

A membrane module comprising a hollow fiber membrane bundle with a longitudinal extent, a membrane bundle cross section and a first and a second bundle end, the bundle comprising a multitude of hollow fiber membranes extending between the first and the second bundle end, and also comprising, within the membrane bundle cross section, a proportion of threads which are arranged between the hollow fiber membranes and which keep the hollow fiber membranes apart. The arrangement of the threads between the hollow fiber membranes is such that at the first bundle end and/or at the second bundle end the hollow fiber membranes protrude beyond at least some of the threads, such that the hollow fiber membrane bundle has a smaller proportion of threads in a first and/or second end region, extending from the first and/or the second bundle end, than in a bundle region, located between the first and the second bundle end, which has a maximal proportion of threads, the length of the first end region and/or the length of the second end region being 1% to 45% of the bundle length.

13 Claims, 5 Drawing Sheets

(58) Field of Classification Search
CPC . B01D 63/024; B01D 63/027; B01D 2313/23
See application file for complete search history.

(56) References Cited

U.S. PATENT DOCUMENTS

| | | | |
|---|---|---|---|
| 4,578,190 A * | 3/1986 | Fowler | B01D 53/22 |
| | | | 210/321.89 |
| 4,940,617 A | 7/1990 | Baurmeister | |
| 2002/0162785 A1 * | 11/2002 | Futselaar | B01D 63/043 |
| | | | 210/321.89 |
| 2010/0035374 A1 | 2/2010 | Lechner et al. | |
| 2012/0006739 A1 | 1/2012 | Doyen et al. | |
| 2015/0107455 A1 | 4/2015 | Mayer et al. | |
| 2016/0107125 A1 * | 4/2016 | Kobayashi | B01D 63/04 |
| | | | 210/232 |
| 2016/0151744 A1 | 6/2016 | Visser et al. | |
| 2016/0158670 A1 * | 6/2016 | Tanizaki | B41J 2/19 |
| | | | 210/321.87 |
| 2018/0169584 A1 | 6/2018 | Visser et al. | |

FOREIGN PATENT DOCUMENTS

| | | |
|---|---|---|
| DE | 4308850 A | 9/1994 |
| DE | 102013017375 A1 | 4/2015 |
| EP | 0329980 A | 8/1989 |
| EP | 0442147 A | 8/1991 |
| EP | 0464737 A | 1/1992 |
| EP | 0732141 A | 9/1996 |
| EP | 0841086 A | 5/1998 |
| EP | 0848987 A | 6/1998 |
| EP | 1634639 A1 | 3/2006 |
| JP | S5335683 B2 | 9/1978 |
| JP | H0260658 A | 3/1990 |
| JP | H06327905 A | 11/1994 |
| JP | 2003290340 A | 10/2003 |
| RU | 89416 U1 | 12/2009 |
| WO | 95/34373 | 12/1995 |
| WO | 2016035798 A1 | 3/2016 |
| WO | 2017167443 A2 | 10/2017 |

OTHER PUBLICATIONS

U.S. Appl. No. 15/578,316, filed Nov. 22, 2017, 2018/0169584, Jun. 21, 2018.
U.S. Appl. No. 15/748,183, filed Jul. 18, 2016.
U.S. Appl. No. 15/748,183, filed Jul. 18, 2016, by Visser et al.
International Search Report (with English translation) and Written Opinion dated Feb. 19, 2019.
Japanese Patent Office Action for Application No. 2020-520559 dated Feb. 1, 2022 (6 pages).

* cited by examiner

MEMBRANE BUNDLE LAYOUT HAVING SPACERS

CROSS-REFERENCE TO RELATED APPLICATIONS

This patent application is the U.S. national stage entry, under 35 U.S.C. § 371, of international application number PCT/EP2018/080615, filed Nov. 8, 2018, which claims priority to European Patent Application No. 17200834.4, filed Nov. 9, 2017, and European Patent Application No. 17208806.4, the entire contents of which are incorporated herein by reference.

The invention relates to a hollow fiber membrane bundle with a longitudinal extent, with a membrane bundle cross section and with a first and a second bundle end, comprising a multitude of hollow fiber membranes extending between the first and the second bundle end, and also comprising, within the membrane bundle cross section, a proportion of threads which are arranged between the hollow fiber membranes and which keep the hollow fiber membranes apart. The invention further relates to a membrane module with a cylindrical housing with a longitudinal extent, where a hollow fiber membrane bundle, oriented in the direction of the longitudinal extent of the housing, is arranged in the housing.

Hollow fiber membrane bundles and membrane modules which have, in their housing, a hollow fiber membrane bundle oriented in the direction of the longitudinal extent of the housing are widely used in industrial and medical sectors, e.g. filtration of fluids, or for dialysis, for gas exchange or for gas separation, in electrodialysis, or as membrane adsorbers. One or both ends of the hollow fiber membrane bundle here can have been embedded into a tube sheet or a potting composition, for example one made of a thermoset resin. In some embodiments it is possible here that the hollow fiber membranes of the bundle are open at both ends and that their lumina are therefore accessible to fluids. Membrane modules of this type are generally operated in what is known as crossflow mode. However, it is also possible that the hollow fiber membranes are open only at one of their ends and are closed at their other end. Membrane modules of this type are suitable for operation in what is known as dead-end mode.

Embedding the hollow fiber membrane ends allows separating the internal cavity, i.e. the lumina of the hollow fiber membranes, from the external space surrounding the hollow fiber membranes, and it is thus possible to supply different fluids to the internal cavity and the external space, which by way of example can have different temperatures for heat-exchange or can have different consistency for mass transfer. Important factors for good effectiveness of such hollow fiber membrane bundles in use are firstly the leakproof embedding of the hollow fiber membrane ends and secondly good capability for uniform flow around the hollow fiber membranes. To this end, it is necessary that the hollow filaments are kept apart, so that their effective surface area is maximized.

To this end, monofil or multifil threads are often introduced between the hollow fiber membranes of the bundle and are embedded together with the hollow fiber membranes during production of the membrane module. These spacer threads keep the hollow fiber membranes apart along the membrane bundle so that good flow can take place around their exterior and, for example, improved mass transfer can thus be achieved.

The form in which the threads are present in the membrane bundle can by way of example be such that in each case at least one thread is wound helically around one or more hollow filaments. The wound threads act as spacers between adjacent hollow filaments, and the thickness of the wound threads here determines the flow cross section between adjacent hollow filaments. Embodiments of membrane bundles of this type are disclosed by way of example in U.S. Pat. Nos. 4,066,553, 4,293,418, US 2010/0035374 or WO 95/34373.

In another embodiment, monofil or multifil spacer threads are introduced between the hollow fiber membranes in the bundle, extending in essence parallel to the hollow fiber membranes, and are embedded together with the hollow fiber membranes into the tube sheets or potting compositions. Embodiments of this type are described by way of example in EP-A-0 329 980, EP-A-0 841 086 or EP-A-0 848 987. A mixed embodiment of spacer threads arranged parallel to the hollow fiber membranes and threads wound around the hollow fiber membranes is disclosed in EP-A-0 464 737 or EP-A-0 732 141.

In another embodiment, the hollow fiber membranes of the membrane bundle are arranged in woven or knitted mats. The hollow fiber membranes are embedded into these mats by means of transverse threads, for example in the form of textile threads. Mats of this type can be produced by known processes in the form of knitted mat or woven mat, or else in the form of woven tape or crocheted mat. In the case of weaving or knitting, the transverse threads are weaving or, respectively, warp threads running perpendicularly to the hollow fiber membranes. By virtue of these transverse threads, the hollow fiber membranes are kept apart and kept in a stable arrangement in essence parallel to one another. Mats of this type and hollow fiber membrane bundles produced therefrom are described by way of example in EP-A-0 442 147, DE-A-43 08 850 or U.S. Pat. No. 4,940,617.

Despite the improvement of external flow around the hollow fiber membranes by virtue of the arrangement of spacer threads between the hollow fiber membranes in the membrane bundles, flow inhomogeneities arise in the regions along the hollow fiber membrane bundle in the module where a fluid is introduced into the external space around the hollow fiber membranes or where a fluid is withdrawn from the external space, i.e. in the inflow and/or outflow regions of the module. These flow inhomogeneities result in non-uniform distribution and/or non-uniform withdrawal of the fluid over the cross section of the bundle. The inhomogeneities can also often not be completely eliminated by conventional design measures in said regions, e.g. by enlarging the housings in the inflow and/or outflow region. Regarding such enlarging, reference may be made by way of example to the descriptions in EP-A-0 329 980.

It is therefore an object of the present invention to provide a hollow fiber membrane bundle which, in a hollow fiber membrane module, firstly allows homogeneous through-flow of fluids and at the same time allows improved inflow and/or outflow into and/or out of the hollow fiber membrane bundle. Another object of the present invention is to provide a hollow fiber membrane module with hollow fiber membrane bundles arranged therein in the longitudinal extent of the module, where the disadvantages of known membrane modules are at least mitigated and where these exhibit improved flow distribution for fluids into the inflow regions and, respectively, regions of outflow into the external space around the hollow fiber membranes arranged in the module.

The object is achieved firstly via a hollow fiber membrane bundle with a longitudinal extent, with a membrane bundle cross section and with a first and a second bundle end, where the hollow fiber membrane bundle comprises a multitude of hollow fiber membranes extending between the first and the second bundle end, and also comprises, within the membrane bundle cross section, a proportion of threads which are arranged between the hollow fiber membranes and which keep the hollow fiber membranes apart. The hollow fiber membrane bundle is characterized in that the arrangement of the threads between the hollow fiber membranes is such that at the first bundle end and/or at the second bundle end the hollow fiber membranes protrude beyond at least some of the threads, such that the hollow fiber membrane bundle has a smaller proportion of threads in a first and/or second end region, extending from the first and/or the second bundle end, than in a bundle region, located between the first and the second bundle end, which has a maximal proportion of threads, the length of the first end region and/or the length of the second end region being 1% to 45% of the bundle length.

The hollow fiber membranes in the hollow fiber membrane bundle of the invention are kept apart by the threads arranged between the hollow fiber membranes. It is thus possible, when fluid flows through the hollow fiber membrane bundle, to achieve flow around the external side of the hollow fiber membranes that is uniform over the cross section of the membrane bundle.

The invention requires that the arrangement of the threads in relation to the hollow fiber membranes is such that at the first and/or second bundle end the hollow fiber membranes protrude beyond at least some of the threads, such that the hollow fiber membrane bundle has a smaller proportion of threads in a first and/or second end region, extending from the first and/or the second bundle end, than in a bundle region, located between the first and second bundle end, which has a maximal proportion of threads. For a membrane module comprising a membrane bundle of this type, this results in a lower fill level with greater interstices between the hollow fiber membranes in the region of the first and/or second end of the hollow fiber membrane bundle. This provides an improved capacity for flow through the bundle over the cross section of the bundle in said regions, and therefore improved distribution over the cross section of the bundle of a fluid flowing into said regions and/or more uniform outflow of a fluid flowing out from said regions. The improved distribution and/or the more uniform outflow of the inflowing and, respectively, outflowing fluid is assisted by the lower flow resistance prevailing in both locations, compared to the bundle region with maximal proportion of threads.

In a preferred embodiment, the hollow fiber membranes protrude at the first and at the second end of the hollow fiber membrane bundle and, the hollow fiber membrane bundle has a smaller proportion of threads in a first end region, extending from the first bundle end, and in a second end region, extending from the second end, than in a bundle region which is located between the first and the second bundle end, having a maximal proportion of threads. In an embodiment of this type, it is possible to achieve improved capacity for flow through the bundle in a module and, respectively, improved capacity for flow around the hollow fiber membranes at both ends of the membrane bundle in the module interior, and by way of example to realize an inflow region at one end of the membrane bundle and an outflow region at the other end of the membrane bundle.

The length of the first end region and/or the length of the second end region depends for example on the actual bundle length or on the cross section of the bundle and can preferably be in the range of 1% to 30% of the bundle length, particularly preferably in the range of 1% to 15% and, in an embodiment that is even more preferred, in the range of 5% to 15%. Therefore, for long bundles the length of the respective end region may rather lie within the lower percentage range of the ranges specified above and for shorter bundles may rather lie within the upper percentage range. In thick hollow fiber membrane bundles it can likewise be advantageous to select end-region lengths in the upper percentage range.

In an alternative embodiment, the length of the bundle region with maximal proportion of threads can be 10% to 90% of the bundle length, and in a preferred embodiment here it can be 10% to 50%. In a particularly advantageous embodiment of this type, the length of the bundle region with maximal proportion of threads is 10% to 30% of the bundle length. The length of the bundle region with maximal proportion of threads here can depend on whether by way of example the threads between the hollow fiber membranes provide adequate separation of the filaments and sufficient stabilization of the hollow fiber membranes in the totality of the bundle. The length of the bundle region with maximal proportion of threads can likewise depend on whether, during use of the bundle in a module with a fluid flowing through the hollow fiber membrane bundle, a sufficiently high pressure drop is generated in the bundle region with maximal proportion of threads, that can lead to an adequate improvement of the capacity for flow through the end region(s) with a smaller proportion of threads.

The proportion of the threads in the first and/or second end region is advantageously smaller by at least 50% on average than the proportion of the threads in the bundle region with maximal proportion of threads. The proportion of the threads in the first and/or second end region is particularly advantageously smaller by, on average, at least 80% than the proportion of the threads in the bundle region with maximal proportion of threads. This provides sufficient unoccupied space between adjacent hollow fiber membranes and achieves a greater extent of, for example, improved through-flow capacity in the sense of homogeneous distribution, over the cross section of the bundle, for a fluid flowing into the end region. Because the invention also comprises embodiments of the hollow fiber membrane bundle where the threads in an end region can terminate at different positions along the hollow fiber membrane bundle, the value for the proportion of threads in the respective end region that is compared with the proportion of threads in the region with maximal proportion of threads is the average value. Embodiments of the hollow fiber membrane bundle, where the threads in an end region can terminate at different positions along the hollow fiber membrane bundle, can arise in designs, where the threads have an extension component in the direction of longitudinal extent of the hollow fiber membrane bundle, for example because the threads have been displaced in relation to one another along the extent of the hollow fiber membrane bundle, because threads of different length have been used, or because, as explained in more detail below, different shrinkage behavior of the threads during production of the hollow fiber membrane bundle can lead to different positions of the ends of the threads along the bundle.

In a particularly preferred embodiment, the first and/or second inflow region is/are free from threads. It is preferable here that the threads in the bundle region, located between the first and the second bundle end, which has maximal proportion of threads terminate in a cross-sectional plane along the extent of the hollow fiber membrane bundle. This results in clear delimitation of the respective end region.

In respect of the threads used in the hollow fiber membrane bundle of the invention, there are many possible designs, and it is possible to make use of known threads used as spacers between hollow fiber membranes. The threads can therefore be monofilament yarns or multifilament yarns, where the monofilament yarns or multifilament yarns by way of example can exhibit undulation or texturing. There are also various possible cross-sectional geometries for the monofilament yarns and, respectively, the filaments of the multifilament yarns. The yarns and, respectively, filaments can by way of example be round, oval, star-shaped, rectangular, etc. It is also possible that the cross-sectional shapes of the threads change along the extent of same. The linear density of the threads can preferably be in the range of 5 to 2000 dtex. If the threads are multifilament yarns, the threads can preferably be composed of 5 to 2000 individual filaments.

There are various possible embodiments in relation to the arrangement of the threads in the hollow fiber membrane bundle. In a preferred embodiment of the hollow fiber membrane bundle, the threads have a first and a second thread end, and the first and the second thread end are directed toward the first and, respectively, the second bundle end. It is possible here that the threads extend in a straight line between the hollow fiber membranes in the bundle and are parallel to the hollow fiber membranes. However, they can also follow a meandering course, or can be wound helically around individual hollow fiber membranes or around a plurality of hollow fiber membranes combined in subsidiary bundles. There can moreover be by way of example a plurality of threads arranged alongside one another, at a distance from one another and in planes, arranged in a manner that changes over the width of the hollow fiber membrane bundle.

In another preferred embodiment of the hollow fiber membrane bundle of the invention, the hollow fiber membranes of the hollow fiber membrane bundle can be connected to one another by the threads to give mats or ribbons of the type described for example in EP-A-0 442 147 or DE-A-43 08 850. In these cases, the threads can run parallel to one another in an essentially circumferential direction of the hollow fiber membrane bundle, while the hollow fiber membranes extend along the longitudinal extent of the hollow fiber membrane bundle between first and second bundle end. The mats forming the hollow fiber membrane bundle here are to be configured in a manner such that, in accordance with the invention, hollow fiber membranes protrude at least at the first end of the hollow fiber membrane bundle and that the hollow fiber membrane bundle has, in a first end region extending from the first end, a smaller proportion of threads than in a central bundle region, located between the first and the second bundle end, which has maximal proportion of threads.

It is preferable that in the central bundle region with maximal proportion of threads the ratio of the cross-sectional area of the totality of the threads to the cross-sectional area of the totality of the hollow fiber membranes within the membrane bundle cross section is in the range of 0.1 to 10%. This way it is possible firstly to achieve good capacity for flow through the hollow fiber membrane bundle in the region with maximal proportion of threads and secondly to achieve good capacity for flow through the hollow fiber membrane bundle over the cross section of the bundle in the first and/or second end region. The ratio is particularly preferably in the range of 0.2 to 5%, and in a still more preferred embodiment is in the range of 1 to 5%.

The hollow fiber membrane bundle can be a monolithic bundle or else for example a bundle in the shape of a hollow cylinder, for example arranged around a core tube or a monolithic cylinder. The cross section of the hollow fiber membrane bundle can have any desired outer contour, e.g. a circular, oval, elliptical, trilobal, tetralobal, triangular, rectangular, or square contour. The hollow fiber membrane bundle preferably has a circular outer contour.

With the designs described above for the hollow fiber membrane bundles of the invention it is possible to provide hollow fiber membrane modules which exhibit improved flow distribution for fluids that flow into the external space around the hollow fiber membranes arranged in the membrane module or flow out of the external space in the region of the inflow and, respectively, outflow regions. The object of the invention is therefore moreover achieved via a membrane module with a cylindrical housing with a longitudinal extent and with a first and a second housing end, and with a housing shell extending between the first and the second housing end, and also with a housing inner wall, where a hollow fiber membrane bundle of the present invention is arranged in the housing oriented in the direction of the longitudinal extent of the housing.

In a preferred embodiment of the membrane module, the hollow fiber membranes of the hollow fiber membrane bundle are embedded into a first potting composition, which is arranged at the first end of the housing and having a leakproof connection to the housing inner wall, at least at the end allocated to the first bundle end, and the housing is closed by a closure in the region of its second end, where an external space surrounding the hollow fiber membranes and extending between the first potting composition and the closure in the region of the second end of the housing is formed by the first potting composition, the housing inner wall and the closure in the region of the second end of the housing, where the hollow fiber membranes of the hollow fiber membrane bundle are embedded at the first bundle end into the first potting composition in a manner such that the hollow fiber membranes extend through the first potting composition and are open at the first bundle end and are in fluid communication with a first chamber arranged front side at the first end of the housing, where the first chamber is terminated by a first end cap attached front side at the first housing end, and the first end cap has a first connection aperture for the input or output of a fluid, where the first bundle end is embedded into the first potting composition in a manner such that the bundle has, along its extent in the external space, a smaller proportion of threads in a first external space section adjoining the first potting composition than in a central bundle region, located between the first and the second bundle end, which has a maximal proportion of threads, and the length of the first external space section in the direction in which the bundle extends is at least 5 mm, and where the membrane module has a first connection port, which allows introducing a fluid into or withdrawing it from the external space in the region of the first external space section.

This design of the membrane module of the invention provides a region of the hollow fiber membrane bundle in the first external space section, in which there is a larger proportion of interstices present between the hollow fiber membranes due to the smaller proportion of threads present there between the hollow fiber membranes. This, in combination with the required minimum length of the first external space section of 5 mm, has the consequence that for example when a fluid is introduced through the first connection port into the external space in the region of the first external space section, which in this case is the inflow region, it is possible to improve flow around the hollow fiber membranes in this region, and a more homogeneous distribution of the fluid over the cross section of the bundle is obtained. Likewise, if the intention is to withdraw a fluid from the external space through the first connection port in the region of the first external space section, which in this case is the outflow region, the discharge achieved from the external space is homogeneous over the cross section of the bundle. By virtue of the design of the membrane module of the invention in the inflow region and/or outflow region it is therefore possible, in particular for large hollow fiber membrane bundle cross sections, to achieve improved flow behavior over the cross section of the bundle.

For the purposes of the present invention, the expression "connection aperture" means an aperture that is in fluid communication with the lumina of the hollow fiber membranes by way of open ends of the hollow fiber membranes. In contrast, the expression "connection port" of the membrane module of the invention means an aperture for introducing or discharging a fluid which is in fluid communication with the external space or, respectively, an external space section of the membrane module.

As mentioned above, the hollow fiber membrane bundle can be a monolithic bundle or else a bundle in the shape of a hollow cylinder arranged around a core tube or a monolithic cylinder. In such embodiments, the first connection port, which allows introducing a fluid into or discharging it from the external space, can be arranged laterally on the housing shell in the region of the first external space section.

In another advantageous embodiment, the hollow fiber membrane bundle is arranged around a core tube which, together with the hollow fiber membranes, has been embedded into the first potting composition. The core tube extends through the first potting composition and the first chamber, extends from the first chamber past the first end cap, and is in fluid communication with a connection port, which in this case is the first connection port. The core tube has perforations in its wall in the region of the first external space section in which the hollow fiber membrane bundle has a smaller proportion of threads than in a central bundle region, located between the first and the second bundle end, which has a maximal proportion of threads. By way of these perforations, a fluid can flow from the core tube into the external space or from the external space into the core tube in the region of the first external space section.

In a preferred embodiment of the membrane module of the invention, those ends of the hollow fiber membranes that are directed toward the second end of the housing can terminate in the external space, so that a fluid located in the external space can flow freely around these ends of the membranes. It is preferable that the hollow fiber membranes are closed at the second bundle end. The closure of the hollow fiber membrane ends can be achieved for example by adhesive bonding or fusing. In another preferred embodiment, the hollow fiber membranes can be configured as U-shaped loops. In this case, the open ends of the hollow fiber membranes are directed toward the first end of the housing and embedded in the first potting composition. Their U-shaped loops directed toward the second end of the housing are nonattached in the external space.

In cases where those ends of the hollow fiber membranes that are directed toward the second end of the housing terminate in the external space or, as mentioned above, the hollow fiber membranes are configured as U-shaped loops, the housing can be closed at its second end for example by a second end cap which simultaneously forms the closure of the housing at its second end. The second end cap can have a second connection port for the input or output of a fluid into the external space or, respectively, out of the external space, so that a fluid can flow through the external space from one end thereof to the other end thereof. The second connection port can, of course, also be attached laterally in the housing shell and thus lead into the external space around the hollow fiber membranes. In this case it is advantageous that the second bundle end of the hollow fiber membrane bundle terminates at a distance in front of the second end cap, so that a fluid flowing through the external space for example can accumulate in a region of the external space not occupied by the membrane bundle after discharge from the bundle at its second end and can be homogeneously withdrawn over the entire cross section of the membrane bundle.

In cases where, in this embodiment, the hollow fiber membrane is arranged around a core tube which, together with the hollow fiber membranes, has been embedded into the first potting composition and which, in the region of the first external space section, has perforations for introducing a fluid into the external space or withdrawing a fluid from the external space, the core tube can have perforations also at its section directed toward the second housing end, which allow a fluid to flow from the external space into the interior of the core tube or to flow from the interior of the core tube out to the external space. The core tube can extend through the second end cap at its end directed toward the second housing end, having a leakproof seal to the second end cap, and can for example be connected to a second connection port attached to the second end cap. In embodiments of this type, the core tube is advantageously closed along its extent between the first external space section and its section directed toward the second end of the housing, so that no fluid can flow through the core tube where it extends along the hollow fiber membrane bundle.

In embodiments of the membrane module of the invention where those ends of the hollow fiber membranes directed toward the second end of the housing terminate in the external space, it is possible in another preferred alternative that the housing is closed at its second end by an impermeable second potting composition which is applied at the second housing end and has leakproof connection to the housing inner wall and forms the closure. In one embodiment, the membrane module of the invention can then have, arranged laterally in the housing shell, a second connection port which leads into the external space in the region in front of the second potting composition and which is in fluid communication with the external space. A fluid can thus flow through the external space between first connection port and second connection port. In another alternative, it is possible that the housing is terminated at its second end by a second potting composition which has at least one aperture passing through same, and can have, front side at the second end of the housing, a second end cap with a second connection port. There can then be a second chamber formed between second potting composition and second end cap, and the external space and the second chamber can be in fluid communication by way of the at least one aperture in the second potting composition. It is thus possible to conduct a fluid for example out of the external space by way of the at least one aperture in the second potting composition, the second chamber and the second connection port in the second end cap. The at least one aperture can for example take the form of one or more holes through the second potting composition or can take the form of at least one small tube embedded into the potting composition.

Mixed forms are, of course, also conceivable. By way of example, the hollow fiber membrane bundle can be arranged around a core tube which, together with the hollow fiber membranes, has been embedded into the first potting composition and which has perforations for introducing a fluid into the external space or withdrawing a fluid from the external space only in the region of the first external space section. The housing can then be closed at its second end by a second potting composition which is attached at the second housing end and into which that end of the core tube that is directed toward the second potting composition can be embedded, the core tube being closed at this end or along its extent between the first external space and this end. The housing can then have, laterally in the housing shell, a second connection port which leads into the external space.

In another advantageous design of the membrane module, that end of the hollow fiber membranes of the hollow fiber membrane bundle that is directed toward the second bundle end is also embedded into a second potting composition which is arranged at the second end of the housing and which has leakproof connection to the housing inner wall and which simultaneously forms the closure of the housing in the region of its second end.

In one embodiment, the module here can comprise a hollow fiber membrane bundle which has a smaller proportion of threads only at the first bundle end and in which, in the region of the second bundle end, the threads extend as far as the second bundle end, i.e. terminate together with the hollow fiber membranes in essence in the same cross-sectional plane of the bundle. In this case, the threads can then be embedded, together with the hollow fiber membranes, in the second potting composition.

However, it is preferable that the membrane module comprises a hollow fiber membrane bundle which also has a smaller proportion of threads in a second end region extending from the second end than in a bundle region, located between the first and the second bundle end, which has maximal proportion of threads, where the second bundle end is embedded into the second potting composition in a manner such that the bundle has, along its extent in the external space, a smaller proportion of threads in a second external space section adjoining the second potting composition than in a bundle region, located between the first and the second bundle end, which has maximal proportion of threads, and the length of the second external space section in the direction in which the bundle extends is at least 5 mm. The membrane module then advantageously has, in its housing shell in the region of the second potting composition, a second connection port which is in fluid communication with the external space and through which a fluid can be introduced into the external space or withdrawn from same. A fluid can therefore flow in crossflow mode through the external space around the hollow fiber membranes from one end of the housing to the other. Because of the presence of the first and of the second external space section with an at least reduced proportion of threads, the membrane module then has an inflow region and an outflow region in relation to the external space in which a fluid can achieve inflow that is at least substantially homogeneous over the cross section of the bundle and from which a fluid can achieve outflow that is at least substantially homogeneous over the cross section of the bundle.

In a preferred variant, the second end of the hollow fiber membranes can be embedded into the second potting composition in a manner such that they are closed at this end. This can be achieved in that the second ends of the hollow fiber membranes terminate within the second potting composition and are closed by the second potting composition. In an embodiment of this type, a flow into the internal cavities of the hollow fiber membranes, i.e. into their lumina, can occur in dead-end mode from the first end of the hollow fiber membrane bundle. In an advantageous embodiment, the housing can then have a second connection port attached laterally in the housing shell at the second end of the housing in the region in front of the second potting composition, which leads into the external space and which is in fluid communication with the external space. A fluid can thus flow in crossflow mode through the external space between the first connection port and the second connection port. In an alternative, it is possible that the housing is terminated at its second end by a second potting composition which has at least one aperture passing through same, and can have, front side at the second housing end, a second end cap with a second connection port. There can then be a second chamber formed between the second potting composition and second end cap, and the external space and the second chamber can be in fluid communication through the at least one aperture in the second potting composition. It is thus possible to withdraw a fluid from the external space for example through the at least one aperture in the second potting composition, the second chamber and the second connection port in the second end cap. In this embodiment a fluid can also flow in crossflow mode through the external space between the first connection port and second connection port. The at least one aperture can for example take the form of one or more holes through the second potting composition or can take the form of at least one small tube embedded into the potting composition.

In a variant that is likewise preferred, the hollow fiber membranes of the hollow fiber membrane bundle can be embedded at the second bundle end into the second potting composition in a manner such that the hollow fiber membranes extend through the second potting composition, and the lumina of the hollow fiber membranes are open at the second bundle end. In front of the second end of the housing there is a second end cap arranged, the second end cap here being configured in a manner that forms a second chamber between the second potting composition and second end cap. The lumina of the hollow fiber membranes in this case lead into the second chamber and are in fluid communication with same. The second end cap then has a second connection aperture for introducing a fluid into or withdrawing it from the second chamber. In an embodiment of this type, therefore, a fluid can flow in crossflow mode through the hollow fiber membranes in their lumina.

Also for example in this embodiment, where the hollow fiber membranes are embedded into a first and into a second potting composition in the region of the housing ends and lead into a first and into a second chamber, designs of the membrane module of the invention with a hollow fiber membrane bundle arranged around a core tube are possible. In an embodiment that is preferred here, the hollow fiber membrane bundle can be arranged around a core tube which, together with the hollow fiber membranes, is embedded into the first and into the second potting composition. The core tube can pass through the first potting composition and also the first chamber, extend out of the first chamber by way of the first end cap, and, at its first end, can be in fluid communication with the first connection port. At the second end of the housing, the core tube can pass through the second potting composition, can run through the second chamber, can pass through the second end cap, with leakproof seal to the second end cap, and can be in fluid communication with a connection port attached to the second end cap. In the region of the first external space section, in which the hollow fiber membrane bundle has a smaller proportion of threads than in the central bundle region, located between the first and the second bundle end, which has a maximal proportion of threads, the core tube can have perforations in its wall, through which a fluid can flow from the core tube into the external space or from the external space into the core tube in the region of the first external space section. The core tube can also have perforations in its wall in the region of the second external space section adjoining the second potting composition, through which a fluid can flow from the core tube into the external space or from the external space into the core tube in the region of the second external space section.

In an embodiment of this type, for example, a first fluid can flow into the core tube through the first connection port and flow into the first external space section through the perforations in the core tube wall in the region of the first external space section, in which a smaller proportion of threads is present and flow around the hollow fiber membranes is thus improved. The fluid can then flow through the external space along the hollow fiber membranes between the first potting composition and the second potting composition. In the course of this, for example, filtration of a portion of the first fluid through the walls of the hollow fiber membranes into the lumina of the hollow fiber membranes can take place. The remaining portion of the first fluid flows through perforations in the core tube wall from the second external space section into the core tube in the region of the second external space section, in which a smaller proportion of threads is likewise present, and flows from the core tube through the second connection port out of the membrane module.

Then, for example, a second fluid can be introduced into the second chamber formed between the second end cap and second potting composition through the second connection aperture in the second end cap arranged at the end in front of the second end of the housing. The second fluid can flow from there into the open lumina of the hollow fiber membranes and can flow through the lumina of the hollow fiber membranes, where it can incorporate the filtrate of the first fluid. The second fluid thus enriched leaves the hollow fiber membranes at the first bundle end and flows into the first chamber arranged at the first end of the housing. The enriched second fluid flows out of the membrane module through the first connection aperture in the first cap.

It is, of course, also possible to combine further, for example known, measures, e.g. with the aim of achieving further improvements in inflow and/or outflow behaviour, in the present membrane module having the inventive design of the inflow region and/or outflow region of the module. For example, the housing can have a widened section along the housing shell in the section of the inflow and/or outflow region and the hollow fiber membrane bundle be tightly enclosed by the housing shell in the central region. To this end, the diameter of the housing shell can increase constantly, e.g. in the form of a truncated cone, or stepwise in the inflow region and/or outflow region in the direction of the respective housing end.

The membrane module of the invention can be optimally employed for a multitude of uses where a fluid is introduced into or withdrawn from the external space around hollow fiber membranes arranged in the module. Examples that may be mentioned are modules for filtration, for gas exchange and for gas separation. The modules of the invention can also be employed as membrane adsorbers or as combinations of membrane filters with adsorbers. Designs of the membrane module of the invention, where both ends of the hollow fiber membrane bundle are embedded into a potting composition and the hollow fibers are open at both ends and have both an inflow region of the invention and an outflow region of the invention, can be employed with excellent results as dialyzers for example for hemodialysis.

The hollow fiber membrane bundle of the invention, and also the membrane module of the invention can be produced in various ways. In one embodiment, introduction of the threads into the hollow fiber membrane bundle can take place during bundle production via placement of hollow fiber membranes and simultaneous placement of threads that are shorter than the hollow fiber membranes, where the threads are arranged in relation to the hollow fiber membranes in a manner such that, as required by an embodiment of the bundle of the invention, sections with at least a reduced proportion of threads are obtained at one, or at both, bundle end(s). Such placement of hollow fiber membranes and threads can be realized for example by various linear placement processes. It is possible here that during membrane bundle production the threads are placed individually or in the form of a thread assembly, in straight lines or else in changing manner or in meandering shapes.

In another embodiment, production of the hollow fiber membrane bundles of the invention is based on textile forms of the hollow fiber membranes, e.g. woven mats, knitted mats, loose-construction ribbons or other ribbons, as already mentioned above. The design of these fabricated textile forms must be such that at at least one end of the resultant bundle a smaller proportion of threads is present in an end region extending from said end. For example, woven mats can be produced where the hollow fiber membranes form the warp filaments and the lateral regions of the woven mats are free from threads that serve as weft threads and run perpendicularly to the hollow fiber membranes. Winding up mats of this type in the direction of extension of the threads provides bundles where the hollow fiber membranes are arranged along the longitudinal extent of the bundle and the threads are arranged helically around the longitudinal axis and, by virtue of the design of the mat, end sections of the bundle are free from threads.

In cases where threads are wound, e.g. helically, around individual hollow fiber membranes or around a plurality of hollow fiber membranes combined in subsidiary bundles, the winding is carried out only to an extent such that the cut to length hollow fiber membranes have at least one end region free from threads wound around same. The number of cut to length hollow fiber membranes or subsidiary bundles of the hollow fiber membranes that are required for the respective hollow fiber membrane bundle of the invention are then arranged to provide the bundle.

In particular in cases where the ends of the threads are directed toward the first and/or the second bundle end and the threads for example extend in straight lines or in meandering form between the hollow fiber membranes in the bundle or are parallel to the hollow fiber membranes, the hollow fiber membrane bundle of the invention can be produced in a preferred embodiment taking advantage of different shrinkage behavior of hollow fiber membranes and threads. The threads here exhibit higher shrinkage than the hollow fiber membranes. The shrinkage of the threads is preferably initiated by heating. Preference is given to combinations of hollow fiber membranes and threads where, at the required heating temperature, the shrinkage of the hollow fiber membranes in the direction in which they extend is smaller by 2%-50% than the shrinkage of the threads. The required heating temperature depends, of course, on the materials of which the hollow fiber membranes and the threads are composed.

In other preferred variants, the shrinkage can be initiated and controlled via optical, magnetic or physicochemical procedures. Examples of physicochemical procedures can be moistening or treatment with water or solvents or swelling agents, which lead to different longitudinal expansion or different shrinkage of hollow fiber membranes and threads. It is also possible to utilize effects similar to those known from metallic shape-memory alloys and more recently also from shape-memory polymers. The processes described above can be designed in the invention in a manner such that undulation of the defined thread and/or of the membrane takes place simultaneously with length variation; this leads to improved flow through the hollow fiber membrane bundle and at the same time to improved mixing of a fluid flowing through the bundle.

In cases where advantage is taken of different shrinkage behavior of hollow fiber membranes and threads, production of the membrane bundle of the invention can take place before introduction thereof into a module housing, or else can be delayed until the bundle has been introduced into the module housing and is within a module housing.

In the first case, the hollow fiber membrane bundle of the invention with reduced density of threads at one or both bundle ends can be produced as described above and then introduced into a suitable housing in order to produce a module of the invention. In the second case, a bundle with hollow fiber membranes and threads, extending between the bundle ends and having the same length as the hollow fiber membranes, can initially be introduced into a suitable housing and the increased shrinkage of the threads in the bundle is triggered only within the housing. End regions of the bundle located in the housing are thus obtained which have a smaller proportion of threads than the bundle region which is located between the first and the second bundle end which has a maximal proportion of threads. Finally, the membrane module of the invention is obtained by casting of the bundle ends into potting compositions.

In particular in cases where advantage is taken of different shrinkage behavior of hollow fiber membranes and threads for the production of the hollow fiber membrane bundle of the invention or, respectively, for the production of the membrane module of the invention, a possible outcome is that the threads within the hollow fiber membrane bundle do not all terminate at the same position along the hollow fiber membrane bundle. For example, some of the threads can exhibit different shrinkage, with the final result that within the bundle there are threads of different length present, the ends of which terminate at different positions along the extent of the bundle.

In other cases, the threads can have been displaced in relation to one another along the extent of the hollow fiber membrane bundle. For example, in the case where advantage is taken of different shrinkage behavior of hollow fiber membranes and threads for the production of the hollow fiber membrane bundle of the invention or, respectively, for the production of the membrane module of the invention, a possible consequence of jamming of the threads between the hollow fiber membranes can be that during shrinkage the ends of the threads are displaced to a different extent along the extent of the bundle between the first and second bundle end. In such cases some fibers may remain in the resultant first and/or second end region. As mentioned above, the proportion of the threads in the first and/or second end region is reduced by advantageously at least 50%, and particularly preferably at least 80% compared to the proportion of the threads in the bundle region with a maximal proportion of threads. In a particularly advantageous embodiment, the first and/or second end region is free from threads.

The membrane module of the invention comprising the hollow fiber membrane bundle of the invention is explained in more detail with reference to the following figures. The figures show exemplary preferred embodiments of the membrane module of the invention and of the hollow fiber membrane bundle of the invention in a schematic representation and are not to be interpreted as limiting.

Figure 1:
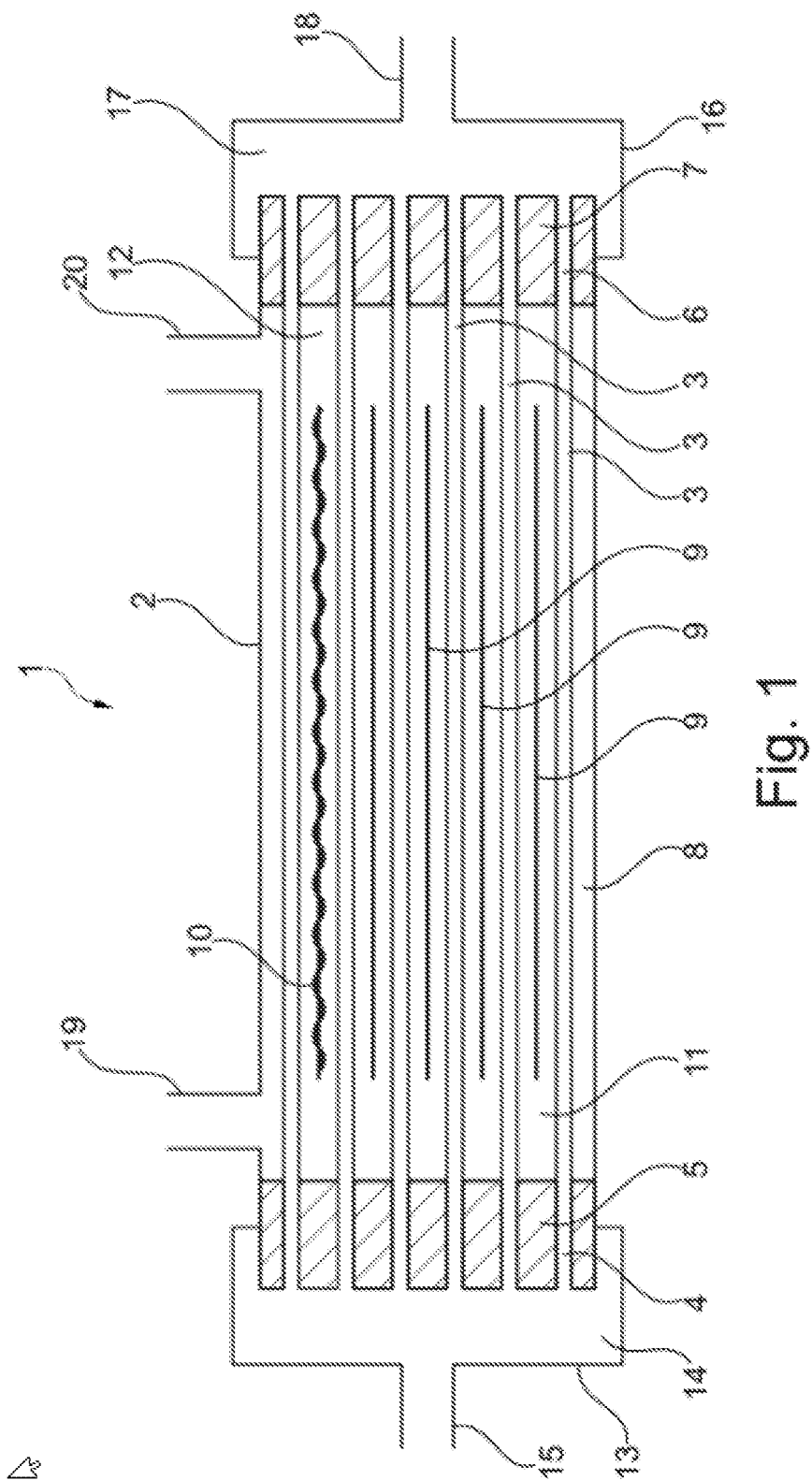
FIG. 1 shows a crossflow membrane module of the invention with a hollow fiber membrane bundle which is embedded in potting compositions on both sides and is free from threads on both of its ends.

FIG. 1 shows a membrane module 1 with a housing 2, and a bundle of hollow fiber membranes 3 arranged in the housing 2, embedded at the first end 4 into a first potting composition 5 and at the second end 6 into a second potting composition 7 in a manner such that they extend through the respective potting composition 5, 7 and are open at the front ends of the potting compositions 5, 7. A fluid can therefore flow in crossflow mode through the lumina of the hollow fiber membranes 3. An external space 8 delimited by the housing 2 is formed around the hollow fiber membranes 3 between the first potting composition 5 and the second potting composition 7. Threads 9, 10 are arranged as spacers between the hollow fiber membranes 3 in the hollow fiber membrane bundle between the potting compositions 5, 7 in a central bundle region along the hollow fiber membranes 3 and can take the form of straight threads 9 or of undulating threads 10. The threads 9, 10 are present in a maximal proportion in this central bundle region, whereas in a first external space section 11 adjacent to the first potting composition 5 and in a second external space section 12 adjacent to the second potting composition 7 the hollow fiber membrane bundle here is free from threads 9, 10.

A first end cap 13 is arranged in front of the first potting composition 5 in a manner such that between the first potting composition 5 and the first end cap 13 a first chamber 14 is formed which is in fluid communication with the lumina of the hollow fiber membranes 3 at the first end 4 of the hollow fiber membranes 3. The first end cap 13 has a first connection opening 15, through which a fluid can be introduced into the first chamber 14. A second end cap 16 is arranged in front of the second potting composition 7. A second chamber 17 is formed between the second potting composition 7 and second end cap 16, which is in fluid communication with the lumina of the hollow fiber membranes 3 at the second end 6 of the hollow fiber membranes 3. The second end cap 16 has a second connection aperture 18 through which for example a fluid can be withdrawn from the second chamber. A fluid can thus flow in crossflow mode through the lumina of the hollow fiber membranes.

The housing 2 has a first connection port 19 at its end directed toward the first potting composition 5 in the region of the first external space section 11, and a second connection port 20 at its end directed toward the second potting composition 7 in the region of the second external space section 12, which enable flow of a fluid through the external space 8, along the hollow fiber membranes 3. A fluid can thus for example be introduced into the housing 2 and, respectively, the external space 8 through the first connection port 19 in the region of the first external space section 11. The lower fill level in the region of the first external space section 11, which is due to the absence of threads 9, 10, results in good capacity for flow through the hollow fiber membrane bundle over the cross section of the bundle in said region, and thus good distribution of a fluid flowing into said region over the cross section of the bundle. The fluid introduced through the first connection port 19 then flows uniformly distributed over the cross section of the bundle along the hollow fiber membranes 3 in the direction of the second potting composition 7 and accumulates in the second external space section 12. This second external space section 12 likewise has a lower fill level, which likewise results in good capacity for flow through the hollow fiber membrane bundle over the cross section of the bundle in said region, and thus uniform draining of the fluid flowing into said region over the cross section of the bundle. The fluid leaves the module 1 from the second external space section 12 through the second connection port 20.

Figure 2:
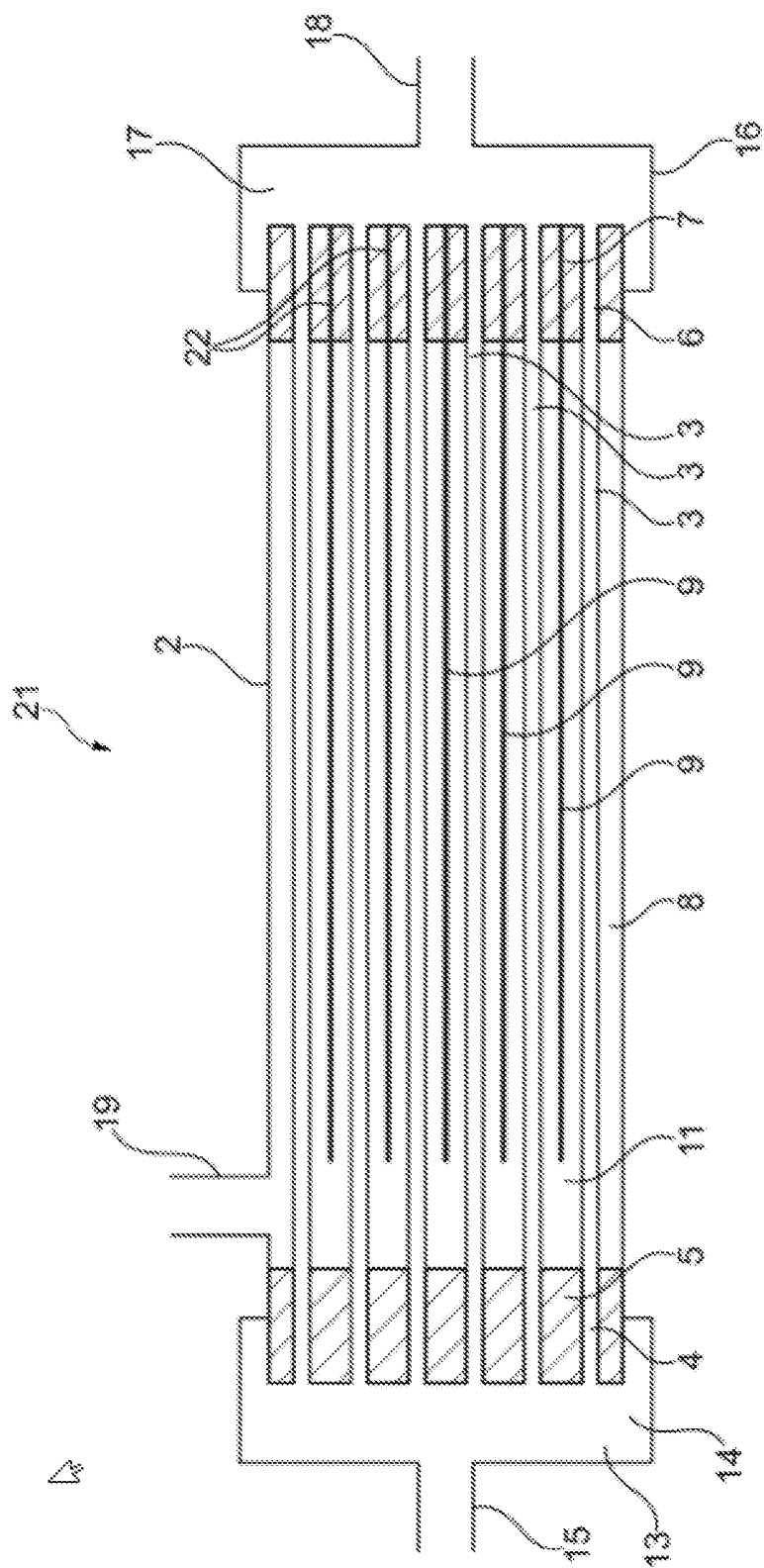
FIG. 2 shows a crossflow membrane module of the invention with a hollow fiber membrane bundle which is embedded in potting compositions on both sides and is free from threads at its first end.

FIG. 2 shows another preferred embodiment 21 of a membrane module of the invention, comprising a hollow fiber membrane bundle of the invention. Insofar as the elements of the membrane module 21 shown in FIG. 2, and also those of the membrane module embodiments shown in the following figures, are the same as those of the membrane module 1 depicted in FIG. 1, they have the same reference signs, and repeated description of those elements is avoided.

The membrane module 21 also comprises a bundle of hollow fiber membranes 3 arranged in the housing 2, embedded at the first end 4 into a first potting composition 5 and at the second end 6 into a second potting composition 7 and extending through the respective potting composition 5, 7. The hollow fiber membranes 3 are open at the front end of the potting compositions 5, 7, and therefore a fluid can flow in crossflow mode through the lumina of the hollow fiber membranes 3.

In contrast to the membrane module 1 shown in FIG. 1, the membrane module 21 shown in FIG. 2 has a region, in which the hollow fiber membrane bundle is free from threads 9, 10, only in a first external space section 11 adjacent to the first potting composition 5. Over the remaining extent of the bundle of hollow fiber membranes 3, there are threads 9 arranged between the hollow fiber membranes 3, which threads extend into the second potting composition 7 at a constant ratio to the hollow fiber membranes 3, and the end 22 of said threads is embedded in the second potting composition 7 together with the ends 6 of the hollow fiber membranes 3. The membrane module 21 shown in FIG. 2 therefore does not have a second external space section 12 adjacent to the second potting composition 7, in which the hollow fiber membrane bundle has a reduced proportion of threads 9 or is completely free from threads 9. Moreover, the membrane module 21 has a first connection port 19 for introducing a fluid into or withdrawing it from the external space 8 only at the end directed toward the first potting composition 5 in the region of the first external space section 11.

In relation to the external space 8, therefore, the membrane module 21 must also be operated in dead-end mode, whereas flow in crossflow mode can take place through the hollow fiber membranes 3 by way of their lumina, which are open at their two ends 4, 6. For example, a liquid can be introduced through the first connection aperture 15 in the first end cap 13, arranged in front of the first end of the housing 2, into the first chamber 14 and from there can flow into the open lumina of the hollow fiber membranes 3, and flow through the lumina of the hollow fiber membranes 3. Here, for example, a portion of the liquid can pass through the walls of the hollow fiber membranes 3 into the external space 8 as a filtrate and flow along the hollow fiber membranes 3 into the first external space section 11, from which it leaves the membrane module 21 through the first connection port 19. The retentate remaining in the lumina of the hollow fiber membranes 3 leaves the hollow fiber membranes 3 at the second end 6 of the hollow fiber membranes 3 and flows into the second chamber 17 arranged at the second end of the housing 2. The retentate leaves the membrane module 21 through the second connection aperture 18 in the second end cap 16.

Figure 3:
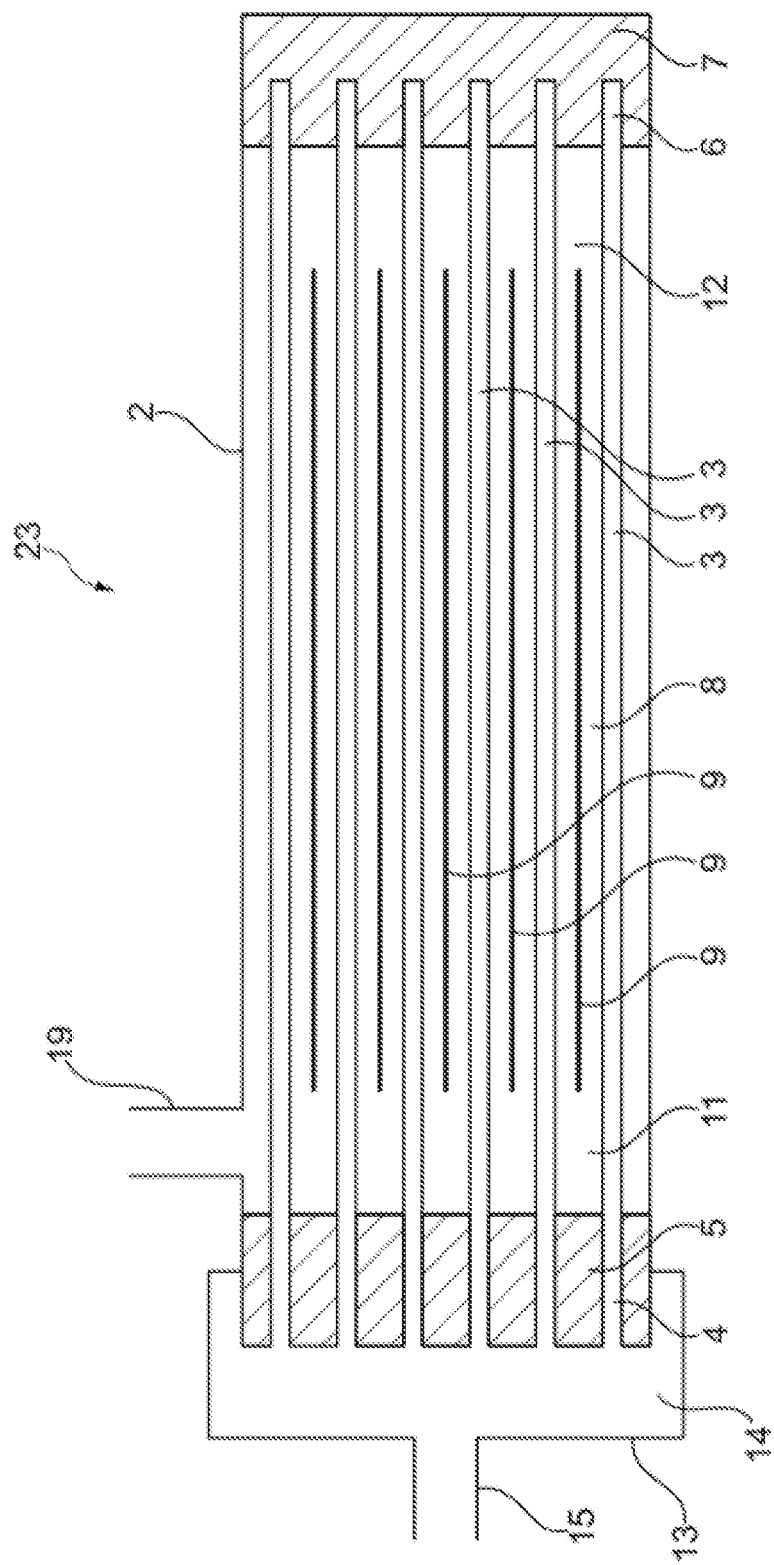
FIG. 3 shows a dead-end membrane module of the invention with a hollow fiber membrane bundle which is embedded in potting compositions on both sides, has open hollow fiber membranes at its first end and is free from threads at both of its ends.

FIG. 3 shows, like FIG. 1, a membrane module 23 with a hollow fiber membrane bundle embedded on both sides into potting compositions 5, 7 and is free from threads 9 at both of its ends. The hollow fiber membranes 3 arranged in the housing 2 to provide a bundle are embedded into a first potting composition 5 with their first end 4 and into a second potting composition 7 with their second end 6. The manner of embedding at the first end 4 is such that the hollow fiber membranes extend through the potting composition 5, are open at the front side of the potting composition 5, and lead into the first chamber 14 formed between the first potting composition 5 and first end cap 13. At their second end 6, the hollow fiber membranes 3 are embedded into the second potting composition 7 in a manner such that they terminate within the potting composition 7 and are closed by the second potting composition 7. The hollow fiber membranes 3 are therefore amenable to flow in dead-end mode. The second potting composition 7 simultaneously forms the closure of the housing 2 at the second end thereof. A fluid introduced from the first chamber 14 into the lumina of the hollow fiber membranes 3 then passes completely—except for a fraction retained for example by filtration in the hollow fiber membranes 3, for example the form of particles of a specific size—through the walls of the hollow fiber membranes 3 into the external space 8 around the hollow fiber membranes 3.

The membrane module 23 has a first connection port 19, through which a fluid can be introduced into the external space 8 and/or can be withdrawn from the external space 8, only at the end directed toward the first potting composition 5 in the region of the first external space section 11. The bundle is free from threads 9 in a first external space section 11 adjacent to the first potting composition 5 for introducing and distributing the fluid uniformly over the cross section of the bundle of hollow fiber membranes 3. As depicted in FIG. 3, the membrane module 23 can moreover also have a second external space section 12 at its second end adjacent to the second potting composition 7. However, it is also possible, in other embodiments not depicted here, that the threads at said end essentially have the same length as the hollow fiber membranes and are embedded into the second potting composition together with the hollow fiber membranes. In this case, the membrane module has an external space section only at its first end.

Figure 4:
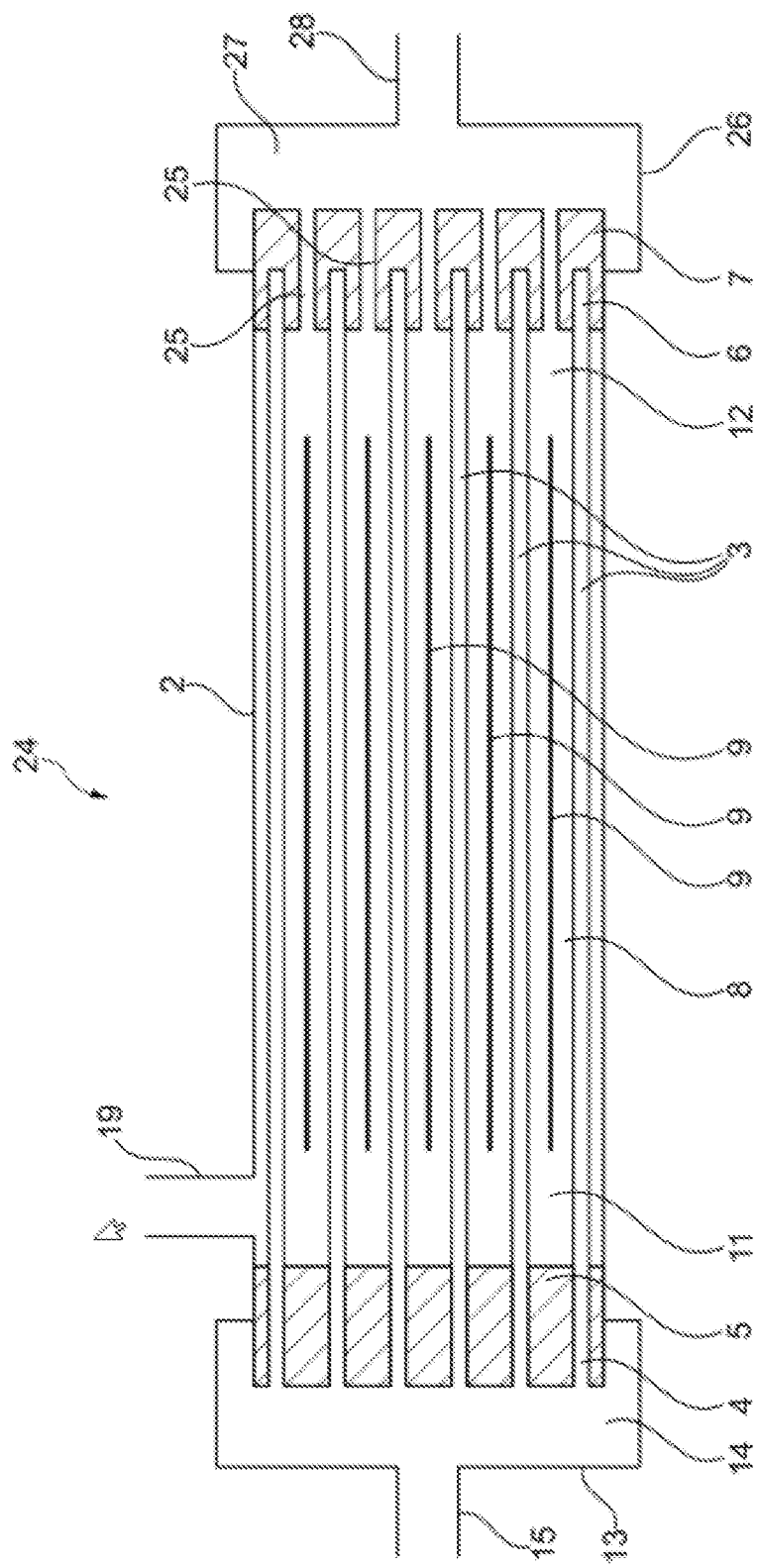
FIG. 4 shows a crossflow membrane module of the invention with a hollow fiber membrane bundle which is embedded in potting compositions on both sides, is free from threads at both of its ends, and has apertures in the second potting composition which are in fluid connection with the external space around the hollow fiber membranes.

The structure of the membrane module 24 shown in FIG. 4 is similar to that of the membrane module 23 depicted in FIG. 3. Membrane module 24 likewise comprises a hollow fiber membrane bundle in which the hollow fiber membranes 3 are embedded on both sides into potting compositions 5, 7 and which is free from threads 9 in a first external space section 11 and in a second external space section 12. Threads 9 are arranged between the hollow fiber membranes 3 between the first external space section 11 and the second external space section 12. Embedding at the first end 4 is such that the hollow fiber membranes extend through the potting composition 5, are open at the front end of the potting composition 5, and lead into the first chamber 14 formed between the first potting composition 5 and first end cap 13. At their second end 6, the hollow fiber membranes 3 are embedded into the second potting composition 7 in a manner such that they terminate within the potting composition 7 and are closed by the second potting composition 7.

The second potting composition 7, which closes off the external space at the second end of the housing, has apertures 25 passing through same, through which there is a fluid communication between the external space 8 and a second chamber 27 formed between the potting composition 7 and a second end cap 26 at the second housing end. The apertures 25 in the potting composition 7 can take the form of holes in the second potting composition, but they can also be small tubes which pass through the second potting composition 7 and which, together with the hollow fiber membranes 3, are embedded into the second potting composition 7.

In this embodiment of the membrane module 24 of the invention, as depicted in FIG. 4, for example a fluid can be introduced through the first connection port 19 into the first external space section 11 within the housing 2 and distributed uniformly over the cross section of the bundle of the hollow fiber membranes 3 in the region of the first external space section 11 because of the lacking fraction of threads 9 there between the hollow fiber membranes 3. It can then flow along the hollow fiber membranes 3 in the direction toward the second potting composition 7 and into the second external space section 12 located in front of the second potting composition 7. From the second external space section 12, the fluid can then be discharged through the apertures 25 in the second potting composition 7 into the external space 8, and can leave the membrane module 24 through the second chamber 27 and the second connection port 28 in the second end cap 26. In contrast to the membrane modules depicted in FIGS. 1 and 2 which likewise have, at their second end, a second chamber delimited by an end cap with an aperture for discharging or introducing a fluid, in the case of the membrane module of FIG. 4 the second chamber 27, formed between the second potting composition 7 and second end cap 26, is in fluid communication with the external space 8 through the apertures 25 in the potting composition 7. Accordingly, the aperture for discharging or introducing a fluid present in the second end cap of the membrane module of FIG. 4 is a connection port in fluid communication with the external space 8. Alternatively, the embedding 7 can also be as in FIG. 3, and the fluid can leave the external space section 12 through another connection port leading into the external space 8.

Figure 5:
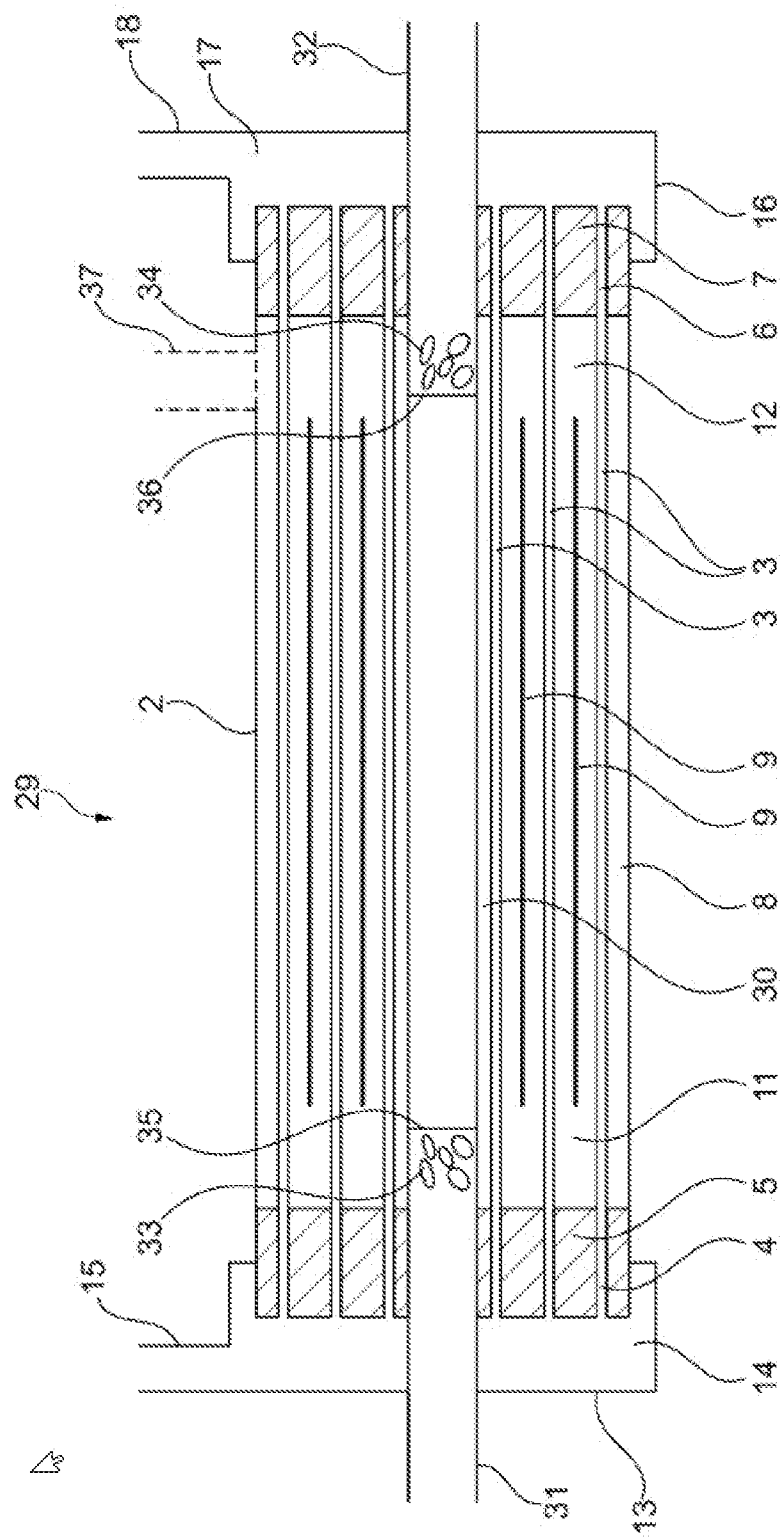
FIG. 5 shows a crossflow membrane module of the invention with a hollow fiber membrane bundle of hollow cylindrical shape which is arranged around a core tube, is embedded in potting compositions on both sides, and is free from threads at both of its ends.

FIG. 5 depicts a membrane module 29 which comprises a bundle of hollow fiber membranes 3 arranged around a core tube 30. The core tube 30 is embedded into the first potting composition 5 and into the second potting composition 7 together with the hollow fiber membranes 3, and extends through the first potting composition 5 and also through the first chamber 14 arranged in front of the first potting composition 5, with the core tube 30 having a leakproof seal to the first chamber 14. The core tube 30 passes out of the first chamber 14 in the first end cap 13 and, at its first end, is in fluid communication with a first connection port 31 connected to the core tube. At the second end of the housing, the core tube 30 passes through the second potting composition 7, runs through the second chamber 17 formed in front of the second potting composition 7, with the core tube 30 having a leakproof seal to the second chamber 14, passes through the second end cap 16, and is in fluidicommunication with a second connection port 32 attached at the second end cap 16 and connected to the core tube. The core tube 30 has perforations 33 in its wall in the region of the first external space section 11, where here the bundle of hollow fiber membranes 3 arranged around the core tube 30 is free from threads 9, through which a fluid can flow from core tube 30 into the external space 8 or, respectively, the first external space section 11 or from there into the core tube 30, in the region of the first external space section 11. The core tube 30 likewise has perforations 34 in its wall in the region of the second external space section 12 adjoining the second potting composition 7, through which a fluid can flow from core tube 30 into the external space 8 or, respectively, the second external space section 12, or from there into the core tube 30, in the region of the second external space section 12. The core tube has closures 35, 36 between the regions with the perforations 33, 34 in order to suppress flow through the core tube 30 from one end to the other. As an alternative to the closures 35, 36, the core tube can also consist of a solid material in its region between the perforations 33, 34.

The hollow fiber membranes 3 are embedded into the potting compositions 5, 7 at their ends 4, 6 in a manner such that they pass through said potting compositions and their ends are open to the first chamber 14 and the second chamber 17, and a fluid can flow through them. First and second end cap 13, 16 have lateral connection apertures 15, 18 through which a fluid can flow into, or out of, the first chamber 14 and the second chamber 17. The housing 3 can moreover have a lateral connection port 37, for example in order to remove air from the external space 8 around the hollow fiber membranes 3. In an alternative embodiment, in which the core tube 30 has perforations 33 in its wall only in the region of the first external space section 11 but not in the region of the second external space section 12, the first fluid can also be withdrawn from the second external space section 12 and, respectively, from the external space 8 through such a lateral connection port 37.

In an embodiment of the membrane module 29 as depicted in FIG. 5 for example a first fluid can flow through the first connection port 31 into the core tube 30 and, in the region of the first external space section 11, where flow around the hollow fiber membranes 3 is improved because of absence of the threads 9, flow through the perforations 33 in the wall of the core tube 30 into the first external space section 11, and be uniformly distributed over the cross section of the bundle. The first fluid can then flow through the external space 8 along the hollow fiber membranes 3 between the first potting composition 5 and the second potting composition 7. Here, for example, transport of a portion of the first fluid takes can occur through the walls of the hollow fiber membranes 3 into the lumina of the hollow fiber membranes 3, or in the opposite direction in respect of the second fluid. In the region of the second external space section 12, in which likewise no threads 9 are present, the remaining portion of the first fluid flows from the second external space section 12 through perforations 34 in the wall of the core tube 30 into the core tube 30, and from there flows out of the membrane module 29 through the second connection port 32 connected to the core tube.

For example, a second fluid can be introduced into the second chamber 17 formed between the second end cap 16 and second potting composition 7 through the second connection aperture 18 in the second end cap 16 arranged in front of the second end of the housing 2. The second fluid can flow from there into the open lumina of the hollow fiber membranes 3 and can flow through the lumina of the hollow fiber membranes 3, where it can incorporate components of the first fluid or release components to same. The second fluid thus enriched or depleted leaves the hollow fiber membranes 3 at their first ends 4 and flows into the first chamber 14 arranged in front of the first potting composition 5. From here, the enriched second fluid flows out of the membrane module 29 through the first connection aperture 15 in the first end cap 13.

What is claimed is:

1. A membrane module comprising:
    a cylindrical housing having a longitudinal extent and a first and a second housing ends, a housing shell extending between the first and the second housing ends, and a housing inner wall, wherein a hollow fiber membrane bundle is arranged in the housing oriented in the direction of the longitudinal extent of the housing;
    the hollow fiber membrane bundle having a longitudinal extent, a membrane bundle cross section and a first and a second bundle ends, comprising a multitude of hollow fiber membranes extending between the first and the second bundle ends, and also comprising, within the membrane bundle cross section, a proportion of threads which are arranged between the hollow fiber membranes and which keep the hollow fiber membranes apart, wherein the threads are arranged between the hollow fiber membranes to have the hollow fiber membranes protrude beyond at least some of the threads at the first bundle end, at the second bundle end or at both bundle ends, such that the hollow fiber membrane bundle has a smaller proportion of threads in a first end region extending from the first second bundle end, in a second end region extending from the second bundle end or in both end regions, compared to a bundle region, located between the first and the second bundle end, which has a maximal proportion of the threads, the length of at least one of said end regions being 1% to 45% of the bundle length;
    wherein:
        the hollow fiber membranes of the hollow fiber membrane bundle are embedded into a first potting composition, which is arranged at the first end of the housing and has a leakproof connection to the housing inner wall, with at least their end located at the first bundle end, and the housing is closed by a closure in the region of its second end,
        an external space, surrounding the hollow fiber membranes and extending between the first potting composition and the closure in the region of the second end of the housing, is formed by the first potting composition, the housing inner wall and the closure in the region of the second end of the housing,
        the hollow fiber membranes of the hollow fiber membrane bundle are embedded at the first bundle end into the first potting composition in a manner such that the hollow fiber membranes extend through the first potting composition and are open at the first bundle end and are in fluid communication with a first chamber arranged front side at the first end of the housing,
        the first chamber is terminated by a first end cap attached front side at the first end of the housing, and the first end cap has a first connection aperture for the input or output of a fluid,
        the first bundle end is embedded into the first potting composition in a manner such that the bundle has, along its extent in the external space, a smaller proportion of threads in a first external space section adjoining the first potting composition than in a central bundle region, located between the first and the second bundle end, which has a maximal proportion of threads, and the length of the first external space section in the direction in which the bundle extends is at least 5 mm, and
        the membrane module has a first connection port in the region of the first external space section for introducing a fluid into or withdrawing it from the external space.

2. The membrane module of claim 1, wherein the length of at least one of said end regions is 1% to 30% of the bundle length.

3. The membrane module of claim 1, wherein the proportion of the threads in the first end region, the second end region or in both end regions is less than 50% of the proportion of the threads in said bundle region with the maximal proportion of threads.

4. The membrane module of claim 1, wherein the first end region or the second end region is free from threads or both end regions are free from threads.

5. The membrane module of claim 1, wherein the threads are monofilament yarns or multifilament yarns.

6. The membrane module of claim 1, wherein the threads have a first thread end directed toward the first bundle end and a second thread end directed toward the second bundle end.

7. The membrane module of claim 1, wherein in a central bundle region the ratio of a combined cross-sectional area of the threads to a combined cross-sectional area of the hollow fiber membranes is in the range of from 0.1 to 10%.

8. The membrane module of claim 1, wherein the ends of the hollow fiber membranes that are directed toward the second end of the housing have a closed design, and the closed ends terminate in an external space.

9. The membrane module of claim 1, wherein the hollow fiber membranes are configured as U-shaped loops with their open ends directed toward the first end of the housing and embedded in the first potting composition and the U-shaped loops, which are directed toward the second end of the housing, nonattached in an external space.

10. The membrane module of claim 1, wherein the end of the hollow fiber membranes of the hollow fiber membrane bundle, that is directed toward the second bundle end, is embedded into a second potting composition, which is arranged at the second end of the housing, has leakproof connection to the housing inner wall and forms a closure of the housing in the region of its second end.

11. The membrane module of claim 10, wherein the hollow fiber membrane bundle has a smaller proportion of threads in a second end region extending from the second end than said bundle region, located between the first and the second bundle end, which has a maximal proportion of threads, and the second bundle end is embedded into the second potting composition in a manner such that the bundle has, along its extent in an external space, a smaller proportion of threads in a second external space section adjoining the second potting composition compared to said bundle region which has a maximal proportion of threads, and the length of the second external space section in the direction in which the bundle extends is at least 5 mm.

12. The membrane module of claim 10, wherein the hollow fiber membranes of the hollow fiber membrane bundle are embedded at the second bundle end into the second potting composition in a manner such that they extend through the second potting composition and their lumina are open at the second bundle end and are in fluid communication with a second chamber arranged in front of the second end of the housing, the second chamber is closed by a second end cap, which has a second connection aperture for the input or output of a fluid in or out of the second chamber, and the housing has a second connection port for the input or output of a fluid into or out of an external space in the region of its second end.

13. The membrane module of claim 10, wherein the hollow fiber membranes are embedded at their second end into the second potting composition in a manner such that they are closed at this end.

* * * * *